Aug. 18, 1953 — W. H. LEUZE — 2,649,317
REMOVABLE SEAL FOR FOOD PROCESSING EQUIPMENT
Filed July 18, 1949 — 3 Sheets-Sheet 1

INVENTOR.
WILLIAM H. LEUZE
BY
ATTORNEY

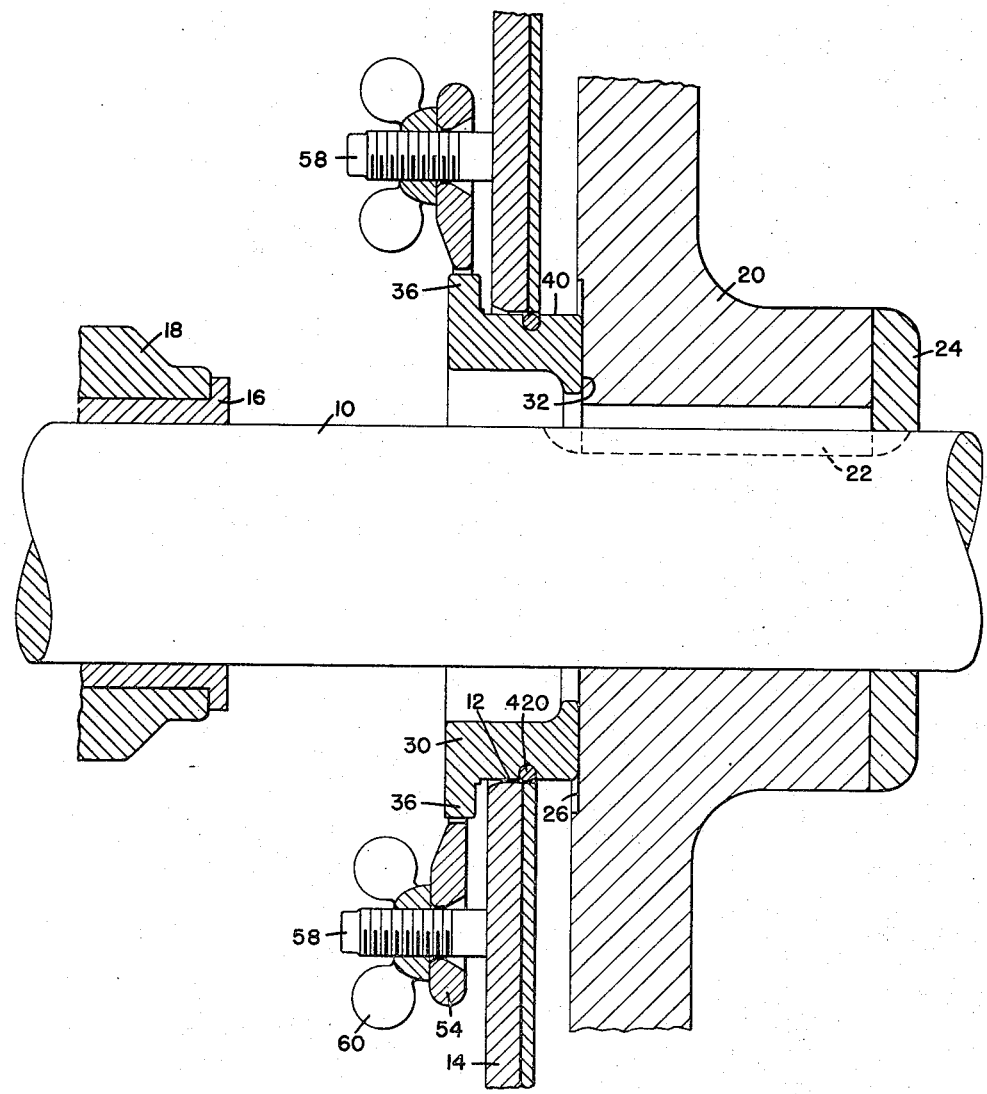

Aug. 18, 1953 W. H. LEUZE 2,649,317
REMOVABLE SEAL FOR FOOD PROCESSING EQUIPMENT
Filed July 18, 1949 3 Sheets-Sheet 3

INVENTOR.
WILLIAM H. LEUZE
BY
ATTORNEY

Patented Aug. 18, 1953

2,649,317

UNITED STATES PATENT OFFICE 2,649,317

REMOVABLE SEAL FOR FOOD PROCESSING EQUIPMENT

William H. Leuze, Cincinnati, Ohio, assignor to Triumph Manufacturing Company, Cincinnati, Ohio, a corporation of Ohio Application July 18, 1949, Serial No. 105,307

1 Claim. (Cl. 286—11.14)

This invention relates to removable, sanitary seals and more particularly to a sanitary seal for food processing equipment.

The object of the invention is to provide a removable sanitary seal for use in food processing equipment of the type which is characterized by a housing having an aperture therein through which a rotatable shafts extends; and particularly to that class of equipment wherein the aperture is considerably larger than the shaft whereby to facilitate thorough hand cleansing of those portions of the housing and shaft adjacent the aperture.

In the food-processing field a serious cleansing problem is presented particularly in those instances where the federal, state, or local laws make it mandatory that all seals be thoroughly cleaned at stated intervals for the purpose of precluding contamination of the food being processes and for eliminating the health hazards which otherwise would arise from the presence of particles of contaminated, putrid, bacterial laden particles of food deposited in those portions of the food processing equipment which were heretofore unaccessible such as, by way of example, the shaft seals provided in the side walls of such equipment.

Another object of the invention is to provide a sanitary, removable seal for food processing equipment, which seal is so constructed and arranged as to be quickly and easily removed to facilitate a thorough cleansing of the component parts of the seal as well as a thorough cleansing of those portions of the piece of equipment adjacent the seal.

A further object of the invention is to provide a removable easy-to-clean seal which is effective under all conditions of operation with respect to pressure, temperature, and speed, which is further characterized by its ruggedness and long life.

Still a further object of the invention is to provide a sanitary, removable, fluid type seal having the hereinabove described characteristics and which comprises a minimum number of parts; and wherein the effectiveness of the seal is not impaired by frequent removals thereof for cleansing purposes.

These and other objects are attained by the means described herein and as disclosed in the accompanying drawings in which:

Fig. 3 is a vertical section through the seal of Fig. 1.

Figure 2:
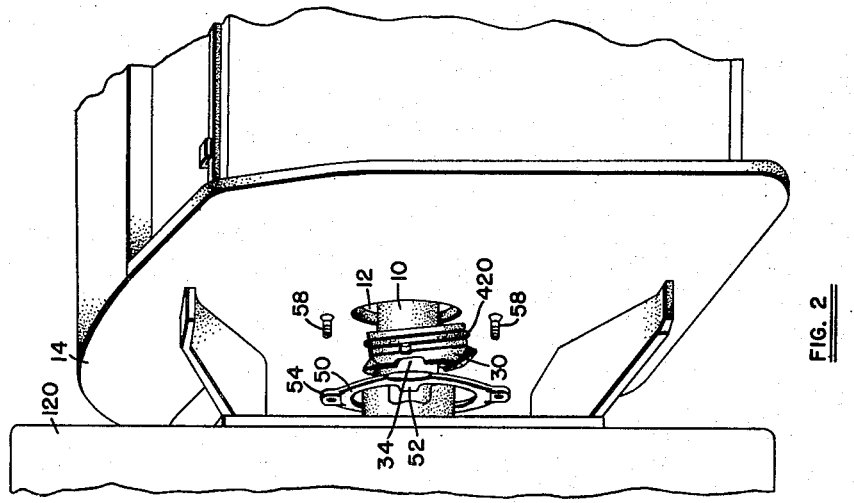
Fig. 2 is a view similar to Fig. 1 but wherein the seal has been removed to facilitate cleansing of its component parts and the adjacent portions of the housing and shaft.
Figure 1:
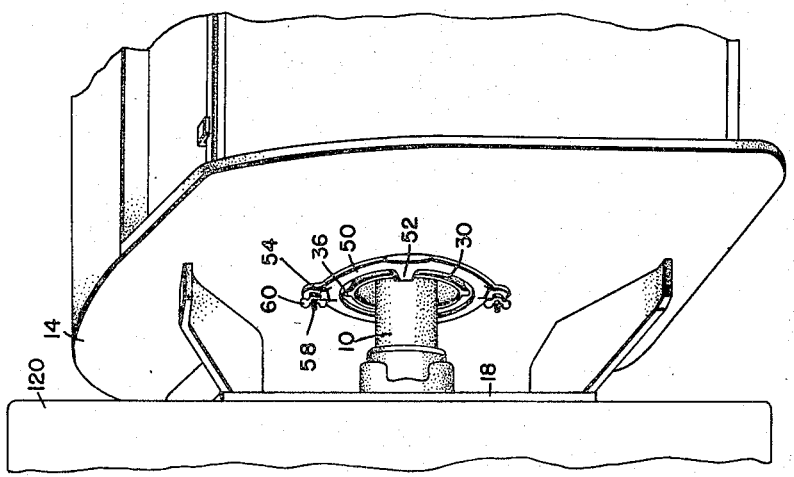
Fig. 1 is a side perspective view of a seal embodying the teaching of the present invention, associated with a dough machine.

With reference now to Figs. 1, 2, and 3, the numeral 10 denotes a rotatable shaft which extends through aperture 12 of a wall, plate or housing 14.

For clarity of detail, and solely by way of example, the seal of the present invention has been illustrated in association with a dough mixing machine wherein the numeral 14 denotes the outer wall of the mixer bowl. As is customary in such machines the rotatable agitator shaft 10 may be suitably journaled, as at 16, to a rigid framework or supporting structure, denoted generally by the numeral 18 which comprises part of the mixer frame 120.

With particular reference now to Fig. 3 it will be noted that agitator 20 is keyed to shaft 10, as at 22, and a fluid sealing plate or any other suitable sealing means 24 is provided for precluding leakage or passage of fluids or their substances along shaft 10.

As heretofore stated one of the prime objects of the present invention is to provide a sanitary, removable, fluid tight seal for food processing equipment which will meet the requirements of the various health authorities to the effect that all parts of food processing equipment with which food products come or may come in contact must be capable of being thoroughly cleansed at stated intervals. These cleansing intervals may, in certain processing operations, be as frequent as several times a day depending upon the nature of the products being processed. In the baking industry, the authorities of New York city require that dough mixing machines be thoroughly cleansed after each use in order to preclude the possibility of undesired mold growth or the existence of other dangerous contaminating agents.

As will be clearly apparent from Fig. 3 a thorough cleansing of those portions of shaft 10 and housing bowl 14 adjacent aperture 12 necessitates removal of the sealing means between the shaft and housing in order that the hand of an operator may be inserted from the outside of the housing to wipe clean the shaft, the inner and outer faces of the housing and aperture opening as well as the adjacent portions of the agitator 20. To this end aperture 12 is dimensioned sufficiently larger than shaft 10 to facilitate the hand cleansing of these parts.

For the purpose of broadly describing my invention, agitator 20 will hereafter be referred to as an abutment element sealed to and rotatable with shaft 10. That side of element 20 adjacent housing 14 is provided with a highly finished bearing surface 26 disposed in a plane at right angles with the axis of rotation of the shaft.

Figure 4:
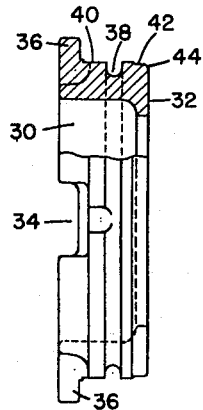
Fig. 4 is a side view, partly in section for clarity of detail, of a gland or seal ring comprising a detail of the invention.
Figure 5:
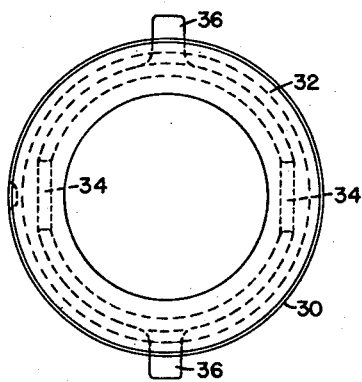
Fig. 5 is a front plan view of the gland of Fig. 4.
Figure 6:
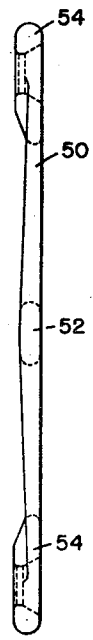
Fig. 6 is an end view of an annular pressure plate comprising a detail of the invention.
Figure 7:
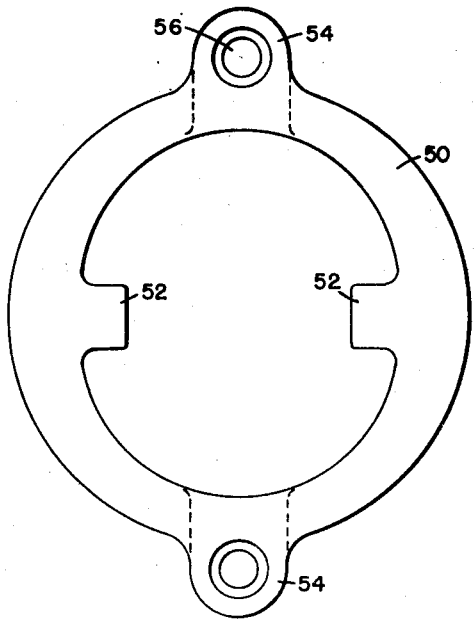
Fig. 7 is a front plan view of the plate of Fig. 6.

An annular gland or packing seal ring, denoted generally by the numeral 30 is dimensioned for a sliding fit with aperture 12 and in loosely spaced circumscribing relationship with shaft 10. This gland, which is fabricated from a suitable noncorrosive material having the desired wear and bearing characteristics, is provided at one end with an annular bearing surface 32 complementary to bearing surface 26 of element 20. As best illustrated in Figs. 2, 4, and 5 diametrically disposed recessed portions, notches or seats 34 are provided in that end or face of the gland remote from bearing surface 32, and a pair of radially projecting interferring members, ears or lugs 36 are provided on an axis disposed at substantial right angles with the axis of recessed portions 34.

An annular groove 38 is provided around and in outer face 40, which as hereinbefore indicated, is dimensioned for a sliding fit with aperture 12. Sealing means, such as, by way of example, an O ring 420, may be received within groove 38 for effecting a positive, fluid-tight seal between adjacent portions of the gland and aperture, see Fig. 3. In order to facilitate insertion of the gland into said aperture, the forward outer edge may be reduced in diameter as at 42 and rounded as at 44, Fig. 4.

An annular pressure plate, denoted generally by the numeral 50 is provided for releasably clamping gland 30 in the operative, sealing relationship illustrated in Figs. 1 and 3. In the preferred embodiment of the invention plate 50 is provided with a pair of diametrically disposed interferring members or fingers 52 dimensioned to be received within recessed portions 34 of the gland. These fingers are constructed and arranged in such a manner as to exert an axial force on the gland while restraining it from rotation about its axis. A pair of mounting ears 54 are provided on an axis disposed at right angles with an axis passing through interferring members 52, said ears being provided with bolt receptive apertures 56, or other means for enabling the plate to be securely though releasably affixed to housing 14 such as by means of fastening elements such as studs 58 secured to and carried by the housing.

With reference now to Fig. 3 it will be noted that gland 30 has been received and seated in aperture 12 of the housing with its bearing surface 32 in abutting fluid-tight relationship with bearing surface 26 of abutment element 20, and with sealing means 420 engaging the inner face of the aperture. Relative motion will occur between bearing surfaces 26 and 32, it being understood that gland 30 will be fixed relative to housing 14 by reason of interfering members or fingers 52 of the pressure plate engaging the recessed portions of the gland. The axial thrust of gland 30 with abutment element 20 is determined by and is a function of the pressure applied through wing nuts 60 to pressure plate 50.

When it is desired to clean the seal and those portions of shaft 10 and housing 14 adjacent aperture 12, the operator need only remove nuts 60 for releasing the pressure plate which may then be shifted away from housing 14, see Fig. 2. The gland may then be withdrawn from aperture 12 in response to a prying action such as will result when a screw driver blade is inserted between lugs 36 and housing 14. The gland may then be shifted along shaft 10 for exposing all portions of the device adjacent aperture 12 whereby gland 30, seal ring 420, housing 14, aperture 12, shaft 10 and abutment element 20 may be thoroughly hand cleaned and all particles of foreign material removed, after which the seal may be reassembled to the conditions disclosed in Figs. 1 and 3. When gland 30 has been removed, as in Fig. 2, the O ring can be lifted out of groove 38 to further facilitate cleansing of said groove and the ring, thereby insuring maximum cleanliness and full compliance with the most rigid of sanitation codes.

The relationship of pressure plate 50 and gland 30, when fully assembled, as in Figs. 1 and 3, is such as to produce a universal joint effect between the gland and bearing surface 26 of the abutment element 20 which will accommodate any misalignment or eccentricity which may be generated incident to rotation of said element about the axis of rotation of shaft 10. The structural details of the pressure plate and gland are such as to permit limited relative motion between the plate and gland, between the plate and housing and between the gland and housing, thereby insuring a positive, fluid tight seal under all conditions encountered in commercial usage, including those encountered by reason of flexing of shaft 10 under peak load conditions.

It has been observed that in practically all installations a certain wobble will occur between gland 30 and housing 14 which is useful in precluding particles of material, such as, by way of example, dough, from accumulating and caking upon the gland adjacent the housing.

In passing it should be noted that I am aware of seals such as, by way of example, are disclosed in the E. Schmierer Patent No. 1,900,523, dated March 7, 1933, and the W. J. Podbielniak Patent No. 2,158,832, dated May 16, 1939, which are too complicated and cumbersome to be used in food processing equipment, particularly in those instances where ease of removal and replacement is an essential feature.

From the foregoing it is apparent that I have provided a simple, foolproof, easy to disassemble and reassemble seal particularly adapted for use in food processing equipment, and other devices wherein removal of seals to assure absolute cleanliness is of prime importance.

It should be understood that various changes and modifications of the device may be made, within the scope of the appended claim, without departing from the spirit of the invention.

What is claimed is:

In a sanitary food processing apparatus, a housing having a wall formed with a large opening, a shaft rotatably mounted and passing through said opening concentric therewith, said shaft being of a diameter disposing the annular surface of the shaft well away from marginal walls of the opening, a member mounted about said shaft within said housing and having a hub portion keyed to the shaft to turn therewith, said member having a flat outer side bearing surface presented towards the opening and spaced from the inner surface of the wall through which the opening is formed, a sealing plate about said shaft engaging the inner end of the hub portion, a stiff cup-shaped ring disposed about said shaft and passed inwardly through said opening and projecting from the inner and outer surfaces of the wall and at its inner end having an internal annular flange spaced radially from said shaft, the inner end of said ring and its internal flange being flush with each other and disposed in flat face-to-face contact with the confronting, flat outer side bearing surface of the hub of said member, a sealing ring about said cup-shaped ring seated in a groove formed about the cup-shaped ring and frictionally contacting the marginal wall of said opening and compressed thereby and forming a sealed joint about the said cup-shaped ring, the outer end of the cup-shaped ring being formed with a pair of radially extending diametrically aligned recesses, a pressure plate circumscribing, spaced from and loosely fitting about the outer end of said cup-shaped ring and provided with a pair of radially extending diametrically aligned inwardly projecting fingers removably engaged in said recesses, a pair of diametrically aligned radial arms projecting outwardly from said pressure plate and formed with openings, said radial arms disposed on an axis at substantial right angles with the diametric axis through said fingers, threaded studs projecting outwardly from said wall and passing through the openings in said arms, and nuts screwed upon said studs and applying pressure against said arms and yieldably forcing the cup-shaped ring inwardly through the opening in the wall and against the confronting bearing surface of said member, for providing limited relative movement between said pressure plate and cup-shaped ring, between said pressure plate and said wall, and between said ring and said wall.

WILLIAM H. LEUZE.

References Cited in the file of this patent

UNITED STATES PATENTS

| Number | Name | Date |
|---|---|---|
| 1,849,912 | Daddysman | Mar. 15, 1932 |
| 1,900,523 | Schmierer | Mar. 7, 1933 |
| 1,972,393 | Radford | Sept. 4, 1934 |
| 2,049,955 | Gilbert | Aug. 4, 1936 |
| 2,363,110 | Krug | Nov. 21, 1944 |
| 2,419,588 | Pasco | Apr. 29, 1947 |
| 2,555,932 | Reed | June 5, 1951 |